US008179233B2

(12) United States Patent
Kia

(10) Patent No.: US 8,179,233 B2
(45) Date of Patent: May 15, 2012

(54) UHF TIMING SYSTEM FOR PARTICIPATORY ATHLETIC EVENTS

(76) Inventor: Arash Kia, Portland, OR (US)

( * ) Notice: Subject to any disclaimer, the term of this patent is extended or adjusted under 35 U.S.C. 154(b) by 645 days.

(21) Appl. No.: 12/141,838

(22) Filed: Jun. 18, 2008

(65) Prior Publication Data
US 2009/0184806 A1    Jul. 23, 2009

Related U.S. Application Data

(63) Continuation-in-part of application No. 12/077,490, filed on Mar. 20, 2008, now abandoned.

(60) Provisional application No. 60/936,740, filed on Jun. 22, 2007.

(51) Int. Cl.
H04Q 5/22 (2006.01)

(52) U.S. Cl. .................. 340/10.51; 340/10.1; 340/10.2; 340/10.3; 340/10.4; 340/10.5; 340/572.1; 340/572.2; 340/572.3; 340/572.4; 340/572.9; 343/839; 343/851; 343/884; 235/375; 235/376; 235/377; 235/380; 235/385

(58) Field of Classification Search ........... 340/10.51, 340/10.1–10.5, 572.1–572.9; 343/839, 851, 343/884; 235/375, 385
See application file for complete search history.

(56) References Cited

U.S. PATENT DOCUMENTS

| 6,301,197 | B1 | 10/2001 | Abbott |
| 6,407,669 | B1 | 6/2002 | Brown et al. |
| 7,017,808 | B2 | 3/2006 | Holzer |
| 7,057,975 | B2 | 6/2006 | Stobbe |

(Continued)

FOREIGN PATENT DOCUMENTS

| DE | 20 2004 012749 | 10/2004 |
| EP | 0 590 590 | 4/1994 |
| EP | 1 376 272 | 1/2004 |
| JP | 2000-271259 | 3/2000 |

OTHER PUBLICATIONS

Alex Sinha, Chip Timing—What It does and How It Works, http://www.marathonguide.com/features/Articles/RaceTimingWithChip.cfm, visited on Jun. 2, 2008 and printed on Dec. 19, 2008, pp. 1-2.

(Continued)

Primary Examiner — George Bugg
Assistant Examiner — Ojiako Nwugo
(74) Attorney, Agent, or Firm — Foster Pepper PLLC; Richard T. Black; Joel B. Ard

(57) ABSTRACT

A participatory athletic event timing system based on back-scattering modulation in the UHF band and including wirelessly encoding writable data tags with participant's bib numbers or a calculated derivative thereof for timing participants in a participative athletic event, and attaching the data tags to the participant's bibs for distribution of the bibs and data tags to participants so as to eliminate the need for matching data tags with bibs and maintaining the sequenced order of the matched data tags and bibs. In a preferred embodiment, when participants register for the event, they are assigned an ID number and a bib printed with that number and having attached to the bib one or more data tag encoded in the tags memory the ID number or a calculated derivative thereof. Before the start of the event, the athlete pulls the data tag from the bib and attaches it to their shoe. Antennas suitably designed and adapted for use with the data tags in participative athletic events are used to communicate with the data tags.

4 Claims, 12 Drawing Sheets

U.S. PATENT DOCUMENTS

| | | |
|---|---|---|
| 7,123,210 B2 | 10/2006 | Bernard et al. |
| 7,136,746 B2 | 11/2006 | Kang et al. |
| 7,548,166 B2 | 6/2009 | Roeder et al. |
| 7,629,888 B2 | 12/2009 | Forster et al. |
| RE41,122 E | 2/2010 | Jamel et al. |
| 2002/0071712 A1 | 6/2002 | Backs |
| 2003/0214406 A1* | 11/2003 | Epstein .................. 340/572.8 |
| 2003/0235116 A1 | 12/2003 | Stobbe |
| 2004/0006445 A1 | 1/2004 | Paek |
| 2004/0074966 A1 | 4/2004 | Holzer |
| 2006/0255950 A1 | 11/2006 | Roeder |
| 2007/0008071 A1* | 1/2007 | Hansen .................. 340/10.3 |
| 2007/0096915 A1 | 5/2007 | Forster et al. |
| 2007/0126556 A1 | 6/2007 | Subramanian |
| 2007/0247306 A1 | 10/2007 | Case |
| 2008/0001745 A1* | 1/2008 | Yarsa et al. ............ 340/572.1 |
| 2008/0157366 A1 | 7/2008 | Hyun |
| 2008/0239920 A1* | 10/2008 | Pompei et al. .............. 369/100 |

OTHER PUBLICATIONS

*Sport Systems Disposable Chip Timing System*, http://www.sportsystems.co.uk/ChipTime.aspx, visited on Jun. 2, 2008 and printed on Dec. 19, 2008, pp. 1-2.

http://www.bestrace.com/, visited on Jun. 2, 2008 and printed on Dec. 19, 2008, pp. 1-2.

IPICO Launches Electronic Sports Timekeeping Solution, Jun. 19, 2006, http://www.marketwire.com/press-release/IPICO-Launches-Electronic-Sp . . . , download date Feb. 3, 2010, 2 pages.

IPICO Inc. RFID Sports Timing Solution Meets Technical Challenge in One of the World's Biggest Road Races, Jun. 4, 2007, http://www.morerfid.com/details.php?subdetail=Report&action=details& . . . , download date Feb. 3, 2010, 2 pages.

Racetimer, http://www.racetimer.se/en/home/about, Apr. 4, 2007, download date Feb. 3, 2010, 1 page.

* cited by examiner

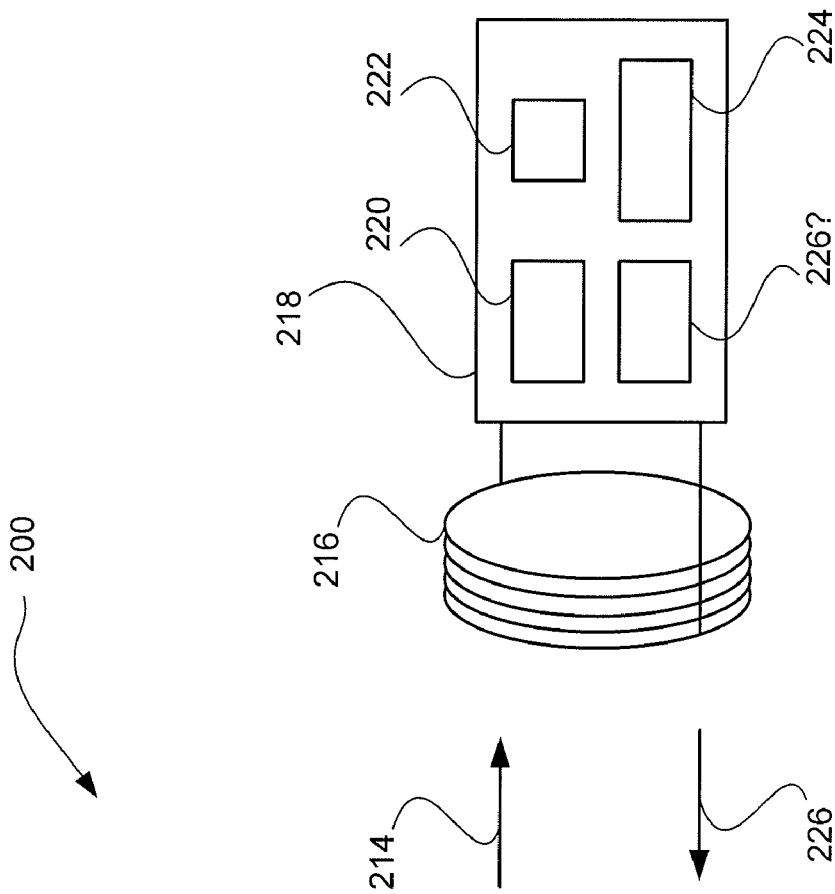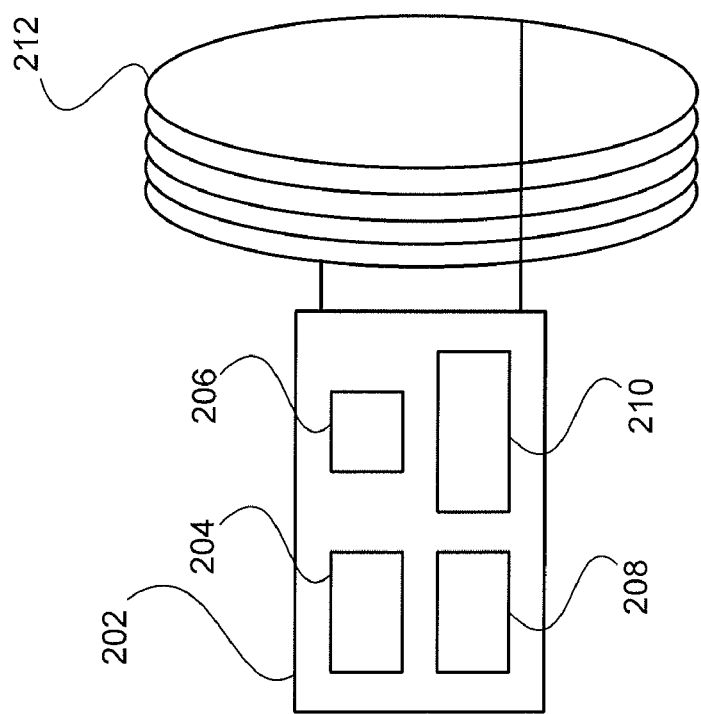
FIG. 2A

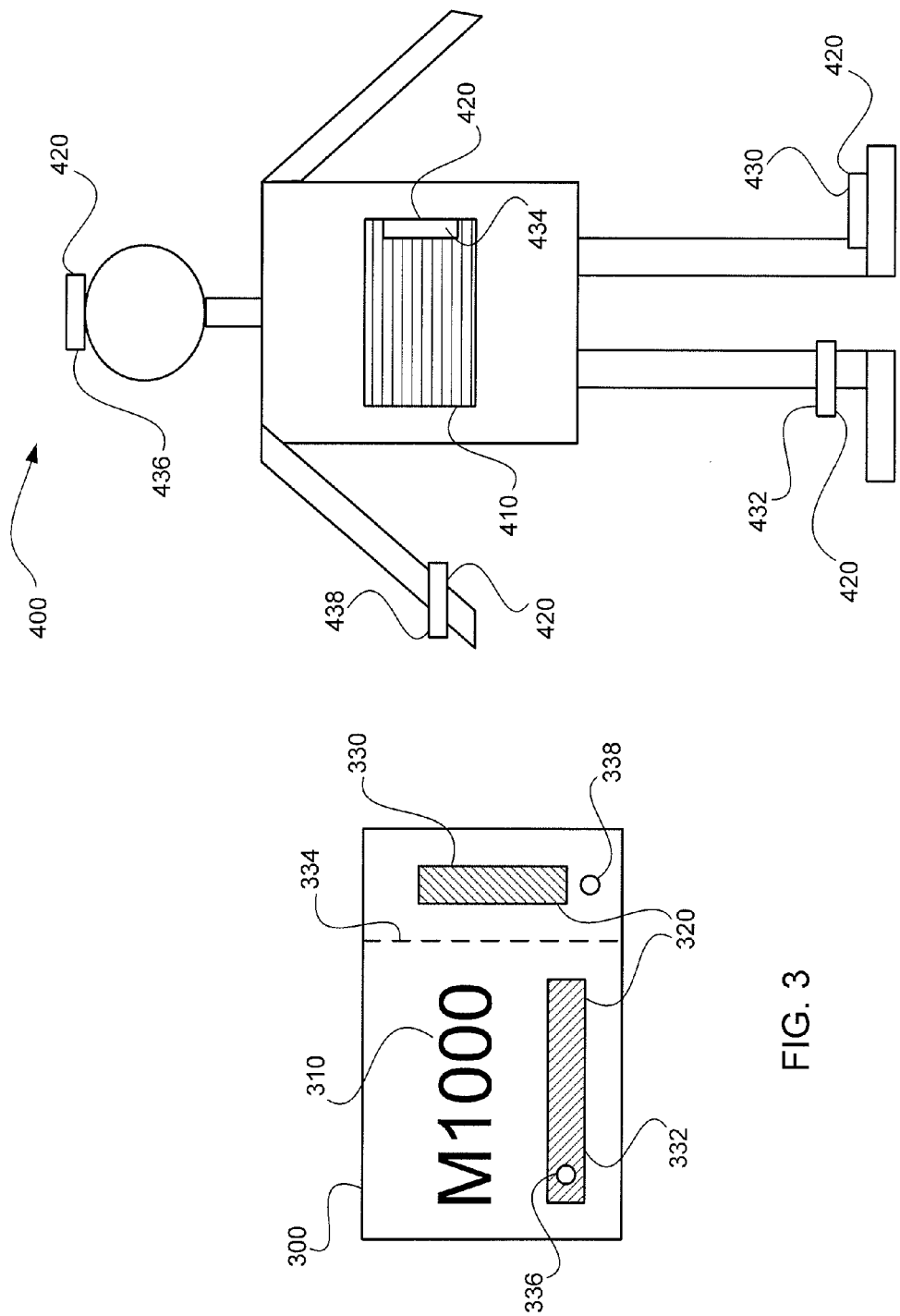

UHF TIMING SYSTEM FOR PARTICIPATORY ATHLETIC EVENTS

BACKGROUND OF THE INVENTION

This is a continuation-in-part of U.S. application Ser. No. 12/077,490, filed Mar. 17, 2008, which claims the benefit of U.S. Provisional Application No. 60/936,740, filed Jun. 22, 2007, the specifications of which are hereby incorporated by reference.

BACKGROUND OF THE INVENTION

This disclosure relates to the design and development of a new participatory athletic event timing system based on backscattering modulation in the UHF band and to encoding wireless data tags such as radio frequency identification (RFID) tags with information corresponding to respective athletic event participants.

Participatory athletic events as used herein refer generally to events involving people who pay an entry fee to participate in an athletic event which attempts to provide accurate course completion times to the participants. In such events, each athlete typically wears a timing chip on his or her body, most commonly on the athlete's ankle or shoe. As typically used, the timing chip uniquely identifies the participant as they cross strategically placed, electronic mats.

Finish-line mats may be used to provide each participant a "gun time" which is the time between the start of the race and the time that the participant crosses the finish-line mats. In addition to mats at the finish line, large races (where it may take a particular participant several minutes to reach the starting line after the official "gun" start of the event) often have mats at the starting line as well so as to provide each participant with a "net" or "chip" time, which is the amount of time that the participant spent between the starting-line and finish-line timing mats. Yet additional mats may be placed along the event course to provide each participant with split times.

Existing chip timing systems generally include a timing chip that carries its own identification number and electronic mats that energize the chip. The chip, which includes electronic circuitry and an energy receiving coil, is typically encased within a glass or plastic inner shell, which is then housed in another plastic outer case. The inner shell is typically weatherproof, which allows for the chip to be worn in various inclement weather conditions. Such chips are referred to as "passive" chips because they do not contain batteries (as do "active" chip designs), and such chips may be reused over and over again.

The chip includes a transponder which is passive and sends no signals until it is placed within the magnetic field created by "energizing" antennas in the timing mats. The magnetic field energizes the coil within the chip, which produces an electric current and powers the chip's transponder. The transponder thereafter sends a signal, typically either in a low frequency (LF) (i.e. under 135 kHz) or high frequency (HF) (i.e. 13.56 MHz), including its own unique identification code, and this signal is captured by the "receive" antennas in the mat, and then collected by a computer.

Existing timing chips typically comprise a Read Only Memory (ROM) type RFID tag having its identification code stored in the RFID tag's ROM. The ID code inside the tag is encoded during the manufacture of the tag and is permanent and unchangeable for the life of the RFID tag. For at least this reason an association process is always required when using ROM based tags, where the internal ID of the ROM based RFID tag must be associated or matched up with an event participant identification number (or racing bib number).

The association process is a very time consuming process in which each athlete's name and assigned identification or bib number is matched with a ROM based RFID tag or "chip." The association information is needed whenever the chip ID code is needed. For example, when an athlete crosses over a detector antenna (or RFID reader/interrogator), the internal ID code of the chip is recorded by a reader and in a second step, the ID must then be cross-referenced to find the athlete's bib number and name. The cross-referencing information needed for this, however, must first have been compiled in advance of and in preparation for the athletic event. To accomplish this compilation of cross-referencing information, the chips need to be matched up with bib numbers while maintaining the sequential order of both in relation to one another. As will be described in greater detail below, the time and resources needed to compile the cross-referencing information are substantial. As a result, the association process required by ROM based timing chips is a significant cost-driver for participatory athletic events in terms of time, money, human labor, and patience.

FIG. 1 provides an example of a common method of sequencing and associating the ROM based chips in preparation for an athletic event. In this example, a group of chips or tags 134 are first randomly sequenced at one end 104 of a wire 106 or cable or something else that could be run through holes in the packaging of the tags so that the order of the tags is not disturbed while laced through this line. A table-top antenna 120 is used to read the chip ID's one at a time. For example, the next tag 108 taken from the group of tags 134 may be slid across the table-top antenna 120 in a direction 116 from one end 104 of the line 106 to the other end 102. A laptop computer 122 may be used to control the table-top antenna 120 (to provide interrogator/reader functionality when connected 124 with the table-top antenna 120). As the tag 108 passes over the antenna 120, the tag's ID code is captured and stored by the computer 122. Some kind of lookup table, spreadsheet, database, or other cross-referencing document must be created to maintain information for determining which tag ID codes have been associated with which bib numbers.

The order in which the tag ID codes are stored must be maintained by the computer 122, and the sequential order of the tags as they are processed must be maintained as well. For instance, all the tags on the line 106 must be maintained in the same sequential order so that they may be matched up (either in real time as the tags are read and sequenced in the computer 122 or at a later time) with a group of participant identification numbers or bib numbers 136. The first three tags 110, 112, 114 to be sequenced, for example, are stored in order in the computer 122 and associated with the first three bib numbers 126, 128, 130 in the group of bib numbers 136. The next tag ID code stored in sequence is then matched up with (or associated with) the next bib number in the stack of bib numbers 136, and this is repeated until the last ordered bib number 132 in the group of bib numbers 136 is associated with a tag sequenced on the line 106.

Any disruption in the sequence in either the tags along the line 106 or in the stack of bib numbers 136 may cause a mismatch between the bib number and the ID code of the chip. Once detected, considerable efforts must be made by event organizers and event managers to reprocess the tags and bib numbers, which basically requires repeating the entire association process described above for matching up specific tags (with their particular ID codes) and bib numbers. If undetected, an incorrect time could get assigned to some or all event finishers.

Tedious processes such as the above are repeated for millions of athletes every year, and there are thousands of events in North America that utilize this or a similar method of associating RFID tags to participant bib numbers every year. Not only is there a significant amount of human labor required for sequencing and associating the ROM based timing chips before an event, additional labor is required for collecting and processing of the chips after the event for their reuse in subsequent events.

Improved methods and systems are therefore needed to address these and other problems with existing participatory event timing. Prior to the present inventor's discoveries and the implementations of systems and methods using his improvements, such improved methods and systems were unknown.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

FIG. 2A is an exemplary magnetic coupled reader and wireless data tag.

FIG. 3 is an exemplary bib with at least one encodable wireless data tag attached to the bib.

FIG. 4 is an exemplary athletic event participant wearing multiple encodable wireless data tags.

DETAILED DESCRIPTION OF PREFERRED EMBODIMENTS

Figure 1:
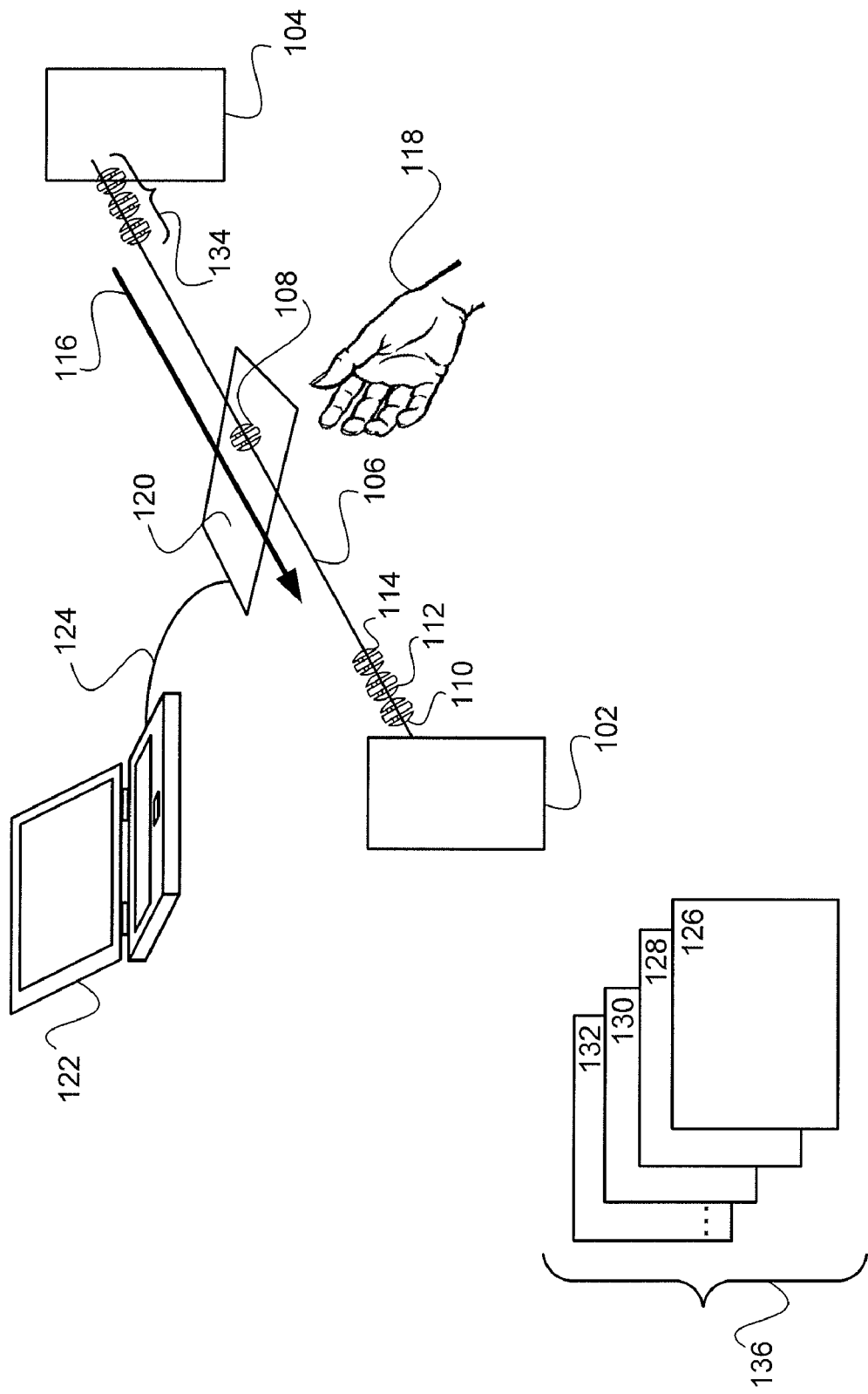
FIG. 1 illustrates tag sequencing and associating conventional RFID tags with bib numbers.

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Although the present invention is primarily described in the context of a running event, the methods and systems described may also be used in any other participatory athletic event or other event where wireless data tags may be worn by a person or attached to the person's gear (i.e. bike, helmet, canoe, shoe) and used for timing the person in an event or activity or for tracking the person or the person's gear before, during, and/or after the event or activity. Further, although various embodiments are described using various technologies such as, for example, ultra high frequency (UHF) wireless data tags, the present invention is not limited to such technologies, and various aspects of the invention are independent of the specific technologies described.

RFID systems may be discussed generally in terms of lower frequency systems operating under 100 MHz and higher frequency systems operating above 100 MHz. Lower frequency systems generally include readers and tags which utilize magnetic coupling and operate in LF (under 135 kHz) or HF (13.56 MHz) frequencies. An exemplary lower frequency system 200 is shown in FIG. 2A and includes an interrogator/reader 202 and a tag 218. The reader 202 may include an integrated circuit (IC) which sends signals to an oscillator 206 creating an alternating current in the reader's coil 212. The current generates an alternating magnetic field that effectively provides power 214 for the tag 218. The magnetic field from the reader's coil 212 interacts with a coil 216 in the tag 218 which induces a current in the tag 218. The induced current causes charge to flow into a capacitor 220, and the charge is trapped by a diode 222. The charge accumulates in the capacitor 220 until the voltage is sufficient to activate an IC 224, which thereafter transmits the ID code of the tag that is stored in the ROM or memory. The highs and lows of the digital signal from the IC 224 turns on and off a transistor 226, which results in variation in the resistance of the tag's circuitry causing generation of a varying magnetic field which in turn interacts with the reader's coil 212. Using a technique referred to as load modulation, the magnetic fluctuations cause changes in the flow of current in the reader's coil 212 in the same pattern as the highs and lows (ones and zeros) transmitted by the tag 218. An analog-to-digital converter 210 changes the variation in current flowing through the reader's coil 212 into a digital signal for an IC 208 in the reader 202 that effectively receives the transmitted tag ID code 226.

Figure 2B:
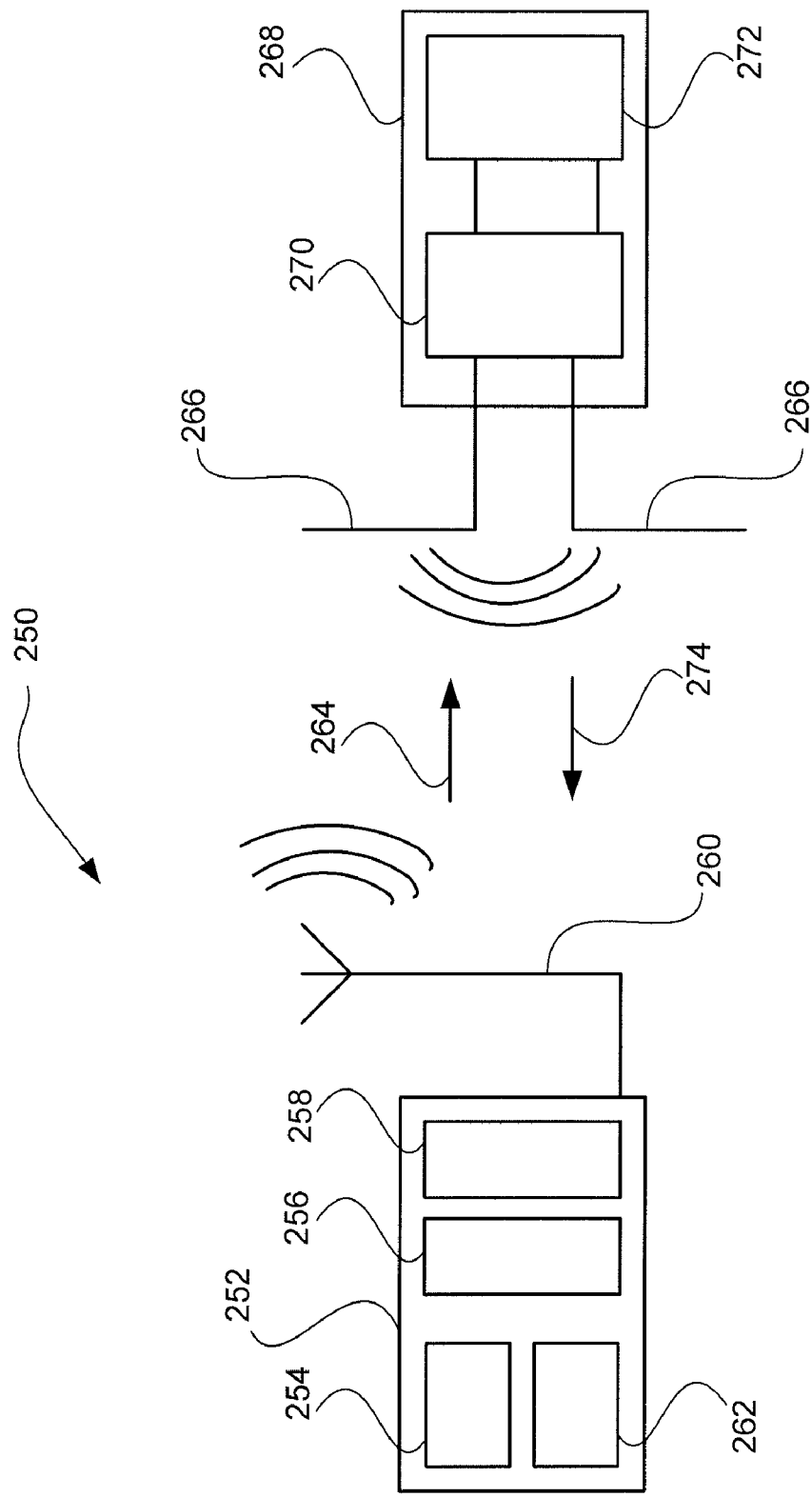
FIG. 2B is an exemplary electromagnetic coupled reader and wireless data tag.

By contrast, higher frequency systems generally include readers and tags which utilize electromagnetic coupling and operate in UHF (from 860 MHz to 930 MHz) or Microwave (from 2.45 GHz to 5.8 GHz) frequencies. An exemplary higher frequency system 250 is shown in FIG. 2B and includes an interrogator/reader 252 and a tag 268. The reader 252 may include an IC 254 which sends a digital signal to a transceiver 256, which generates an analog RF signal that is transmitted by a dipole antenna 260. The electric field of the propagating signal from the dipole antenna 260 creates a potential difference across the tag's dipole antenna 266. The circuitry within the tag 268 is sometimes discussed in terms of RF front end circuitry 270 and analog/digital circuitry 272. Within the RF front end circuitry 270, current caused by the potential difference across the tag's dipole antenna 266 flows into a capacitor, and the charge is trapped by a diode. The charge accumulates in the capacitor until the voltage is sufficient to activate an IC in the analog/digital circuitry 270, and the IC thereafter transmits the ID code of the tag as a digital signal back into the RF front end circuitry 270. The highs and lows of the transmitted signal turn on and off a transistor in the RF front end circuitry 270, and this turning on and off of the transistor causes the tag's antenna 266 to alternately reflect back or absorb some of the incident RF energy received from the reader 252. In a technique referred to as backscatter modulation, variations in the amplitude of the reflected signal correspond to the pattern of the turning on and off of the transistor in the RF front end circuitry 270. The reader's transceiver 256 detects the reflected signals and converts them into a digital signal for the reader's IC 254 for determination of the tag's transmitted ID code.

Other components may be included in the readers and tags described in FIGS. 2A and 2B. Components may be combined or integrated into fewer integrated components or separated. With regard to the higher frequency tags, for example, the combination of the RF front end circuitry 270 and analog/digital circuitry 272 is sometimes referred to as the semiconductor or integrated circuit portion of the tag, to which is attached a small antenna 266. The higher frequency systems preferably include writing circuitry in the reader 252 and writable memory in the tag 268.

Class 1 Gen 2 RFID tags operate in the UHF range of 900 MHz to 928 MHz and are more susceptible to RF energy being absorbed by the water. Consequently, tags operating within this frequency range have not until now been investigated for utilization in applications such as participative athletic events where the human body may be in close proximity to the transmitted signal from the RFID tag. Although the true resonant frequency for excitation of water molecules in human tissue is near 2.5 GHz, there is still considerable absorption by the human tissue. Within the UHF frequency range, the present inventor found that the closer a tag is to the human body, the more likely its energy will be absorbed by the body. The present inventor discovered that a separation of at least one (1) inch or proper shielding is required to prevent excessive absorption into the human body. The present inventor further discovered new and innovative solutions, which are discussed further below, to address the energy absorption and other problems.

Initial testing involved a reader and two antennas from an RFID equipment supplier, Impinj, to test the viability of using UHF RFID technology in timing participatory athletic events. Because UHF systems were widely believed to be infeasible for use in timing participative athletic events, the sentiment among participatory athletic event managers and organizers was completely against such testing. Until the present inventor's efforts, the industry firmly believed that lower frequencies work best for use near the human body. Skeptics warned that at UHF frequencies, the low level energy returned from the tag would be absorbed by the athlete's body, and neither the sensitivity nor a proper range would be available to obtain an accurate read of the ID code inside the UHF tag.

Initial testing started with a set of passive Class 1 Gen 2 tags from an RFID tag supplier, Avery Dennison. As with passive RFID tags generally, the passive Class 1 Gen 2 tags do not have an internal power source. When the tag passes through an RF energy field which is tuned to the frequency of the tag's receiver, the tag powers on and transmits its internal ID code. The reader antennas switch between interrogation and transmission, and during the interrogation phase the reader antennas receive the information transmitted by the tag.

Unlike other passive tags, Class 1 Gen 2 tags include writable memory into which data can be wirelessly encoded. The present inventor discovered that the association process tied to ROM based timing chips and subsequent collection and reprocessing of existing bulky and expensive RFID tags can be eliminated by writing the athlete's bib number into the tag memory, utilizing low cost read/writable tags, and attaching the tags on the athlete's bib. Disposing these tags at the end of the event is a cost issue related to the relative costs (i.e. economics) of collection and re-processing. If disposing the tags is less expensive than re-collection and re-processing, then it is more economical to issue new tags with every event. With this in mind, the inventor set out to discover improved methods and systems having sufficient reliability and improved costs so as to allow for widespread use in timing participative athletic events.

Although other types of wireless encodable data tags may be used, Class 1 Gen 2 tags are preferred in part because such tags are read/writeable, can be made to be physically very small and light weight, and can be manufactured in very high volumes (thus, lowering acquisition costs and allowing the tags to be disposable). The present inventor determined that light weight Class 1 Gen 2 tags tend not to be felt by the athletes when they flap around. Class 1 Gen 2 tags can be adapted for use in light weight packages and paper form factors. Preferably, the wireless data tags have a paper form factor, an omni-directional antenna, and a very light weight (preferably less than one (1) ounce).

In testing, a set of 50 Avery-Dennison AD 622 tags were encoded such that the first 10 digits of the 96 bit EPC code in the tags were the same as the numbers on the bibs that the tags were attached to. The remaining digits were made into trailing zeros. For example, runner # 2711's tag ID was encoded as:

xxxx xxxx xxxx xx00 0000 2711

The x can be any hexadecimal digit between '0' and 'F'. The encoding is in groups of 4 bits, and each grouping is represented by a hexadecimal digit. Only the decimal representation of the bib number was encoded into the tag memory. Therefore no conversion from hexadecimal to decimal was necessary. In the above example the 1, 1, 7, and 2 were not treated as hexadecimal numbers but as decimal numbers.

FIG. 3 shows a race bib 300 according to one embodiment. The bib 300 comprises a printed race number 310 and at least one wireless encodable data tag 320 attached to the bib 300. The race number 310 or a mathematical representation of it is written to the memory of each of the data tags 320.

The race number 310 as shown in FIG. 3 is "M1000" but can be any number, such as "2711" as described above or any other combination of alphanumeric or other symbols. Preferably, the race number 310 comprises only numbers so that, as discussed above, the exact race number may be written to the memory of the data tags 320 so that the ID codes for those tags 320 include the exact race number 310. If the race number 310 includes alphabetical characters, as shown in FIG. 3, then the alpa characters such as the "M" in the race number 310 shown may be represented, for example, by an extra digit written to each tag's memory. For example, for bibs having the "M" prefix (perhaps designating a "male division" of athletic participants) runner # M1000's tag ID may be encoded as:

xxxx xxxx xxxx xx00 5000 1000

An example tag ID code that has the following mathematical relationship to the runner # M1000:

"tag ID code=(offset of 5000 0000 for "M" prefix)+(numeric part of bib number)+(arithmetic offset of 1)"

resulting in the following tag ID code:

xxxx xxxx xxxx xx00 5000 1001

Preferably, the tag itself is encoded with the same number that appears on the bib. However, any reversible process such that the bib number can be determined from the encoded tag number, and vice versa, may be used here. Preferably, the tag is encoded with a tag ID code (or identifier) so that either the tag ID code can be used to determine the bib number or the bib number can be used to determine the tag ID code, without the use of a lookup table or database for cross-referencing between the bib number and the tag ID code.

Having the athlete bib number encoded into the tag so that the same number is used both visually on the bib and electronically in the RFID tag not only eliminates a tremendous amount of labor associated with event preparation before the event but also streamlines the data management aspects of the overall system. Preferably, event organizers use participant bibs, each having at least one passive RFID tag attached to the bib and encoded to have the bib number in its writable memory, to avoid having to match each bib with a particular RFID tag. When participants register for the event, they are assigned an ID number and a bib printed with that ID number and having attached to the bib one or more RFID tags encoded with that same ID number. Before the start of the event, the athlete simply pulls the RFID tag from the bib and attaches it to their shoe (or ankle bracelet).

Preferably, the data tags 320 each comprise a UHF tag 268 as in FIG. 2B and is attached to the bib 300 so that it may be peeled off and laced through shoe laces. For example, tag 332 may be attached to the bib 300 with a mild adhesive that is strong enough to retain the tag 332 for distribution of the bib 300 with attached tag 332 to a participant yet weak enough to allow the tag 332 to be easily detached. A small hole 336 or other features may be included in the tag 332 to allow for reattaching the tag 332 to a shoe.

In one embodiment, the tag 332 can be peeled from the bib 300 and simply stuck to a shoe or other article such as an ankle bracelet or helmet using adhesive on the tag 332. In one embodiment, a tag 330 may be attached to the bib 300 so that detachment of the tag 330 may be accomplished by ripping the portion of the bib 300 along perforations 334. The separated portion with the tag 330 may then be attached to a shoe's laces using a hole 338. Other methods may be used to attach the tags 320 to the bib 300 for distribution to event participants so that the tags may be removed and reattached elsewhere for use during the athletic event.

In one embodiment, deployment of the wireless encoded data tags may be accomplished by having each athlete remove the tag from the bib and place the tag on athlete's shoe. This method has advantages. First, the athlete's shoe acts as a shield between the human foot and the tag, consequently improving communications with the tag (i.e. improving readability of the tag). Second, the shoe is in close proximity with a detector or reader antenna positioned as a timing mat on the ground, again consequently improving communications with the tag. Further, the mostly bone construction of the foot provides additional shielding (as compared with other locations on the athlete).

In one embodiment, deployment of the wireless encoded data tags may be accomplished by having each athlete keep the tag on the bib itself.

FIG. 4 shows an exemplary event participant 400 wearing a bib 410 and several tags 420. Preferably, the RFID tags 420 are attached to the bib 410 when the participant 400 picks up the bib 410 and other event materials prior to the event. Prior to the start of the event, the participant 400 may detach some of the tags and reattach them to shoes 430, clothing, or other articles such as wrist 438 or ankle 432 straps, helmets 436, bicycles, boats, and clothing articles or sporting equipment. Although the preferred location when a single timing tag is used is on the shoe 430 or ankle 432, keeping the tag on the bib itself was tested and is possible, however requires further development and testing. Tags on bibs or tags on wrists may be effective in pre- or post-event activities where tag readers may be suitably positioned proximate to the tags. For example, prior to some events participants may be invited to a carbohydrate (carbo loading) meal. The participants may wear a tag on their wrist so as to allow verification and entry of the participants for the meal, perhaps with event organizers using handheld readers or a table-top reader 120. Likewise, waiting lines for post-event activities may be reduced if the participant's bib 410 includes a wireless data tag 434 attached to it and event managers use handheld readers or suitably pole mounted readers to verify admission into the post-event activity areas.

Also shown in FIG. 4 is a hat or helmet tag 436. In one embodiment, a bicycle helmet tag 436 is used for tracking the helmet before, during, and after an event such as a bike event in a bike race or a triathlon. For example, during the swim portion of the triathlon the bike helmet should typically remain motion free within the transition area. Readers strategically placed about the transition area may be used for tracking the movements of such equipment. During the bike portion of the triathlon, having a tag on the helmet may allow for improved read rates as compared to chest located, bib attached tags because, like the shoe located tags, the bony structure of the head provides some shielding. Moreover, helmet located tags are farther from the metallic mass of the bicycle frame, thus likely improving read rates as compared to chest located tags.

Figure 5A:
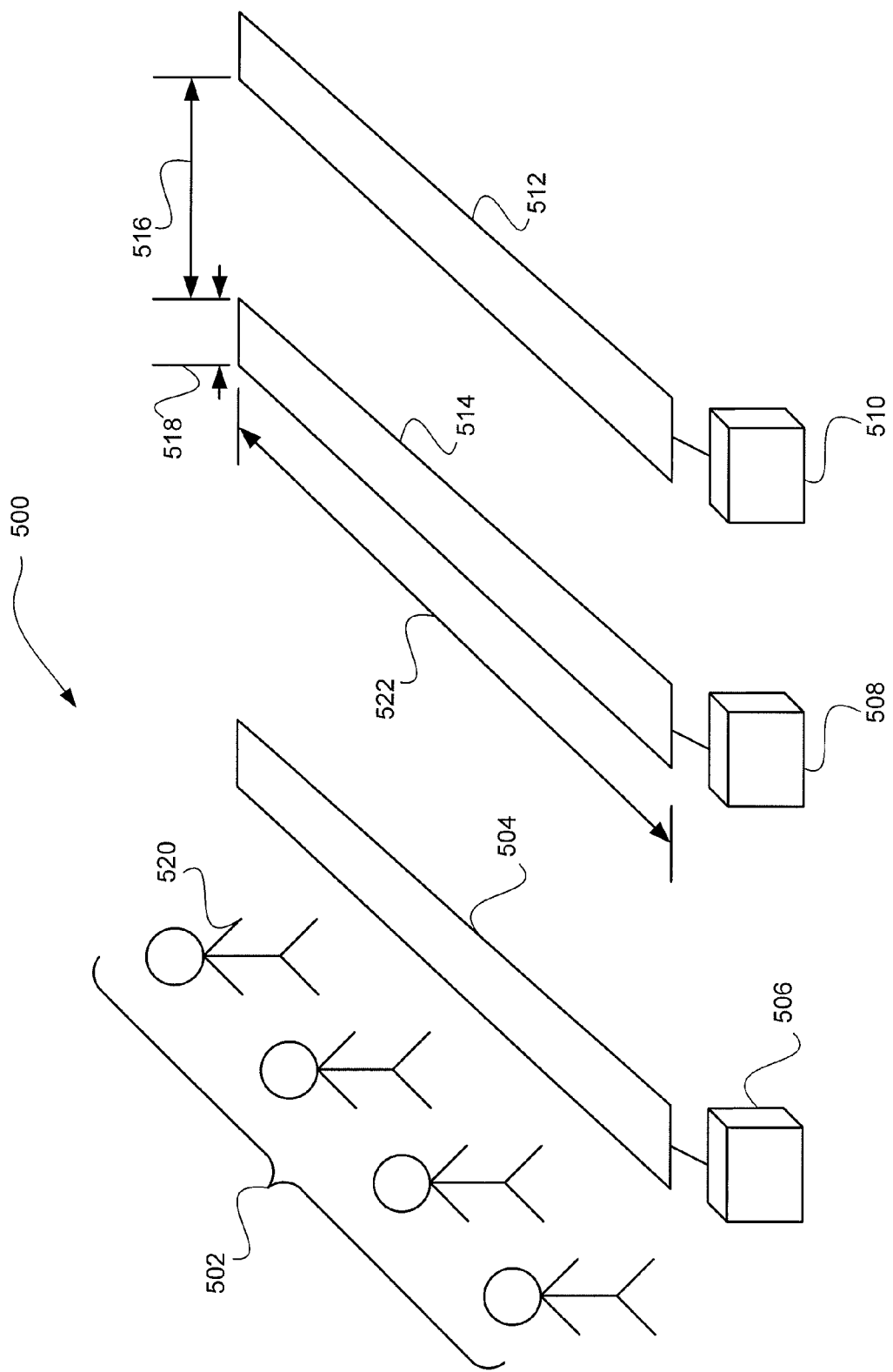
FIG. 5A is an exemplary system of antenna lines for a participatory athletic event.

FIG. 5A shows an exemplary system 500 of antenna lines for a participatory athletic event according to various embodiments. In a participatory event such as a running event, the participants 502 are timed as they run from a starting line to a finish line. Finish line timing mats may comprise a primary line of antennas 514 having a mat length 522 that spans the width of the running course and having a mat width 518 that runs along the lengthwise direction of travel on the running course. A secondary line of antennas 512 spaced apart from the primary line 514 provides a backup to the primary line 514. Starting line timing mats may comprise a single antenna line 504 or may comprise a pair of antenna lines as shown for the finish timing. As a particular runner 520 crosses over the starting line timing mat 504 the runner's writable RFID tag is interrogated/read by the interrogator/reader 506 controlling the starting line antenna line 504, and a starting time for the runner 520 is determined.

Software used by the event managers and organizers coordinates the interrogators/readers 506, 508, 510 controlling their respective antenna lines 504, 514, 512, and as the runner 520 crosses over the finish line mats 514, 512 a net (or chip) time is computed for the runner 520, where the net time is the difference between the starting time and finishing time for runner 520. Gun time may also be computed, which is the time between the first start of the event and the time when the runner 520 crossed the finish line. Various algorithms may be used to control the interrogators/readers to calculate net and gun times, to deal with multiple RFID tags contending for transmitting their tag ID codes and expected signal collisions in such multiple tag situations, to handle computations of times when multiple or backup antenna lines are used, such as with the secondary finish line mat 512 shown, and to rank order finishers according to time and other categories of participants.

Figure 5B:
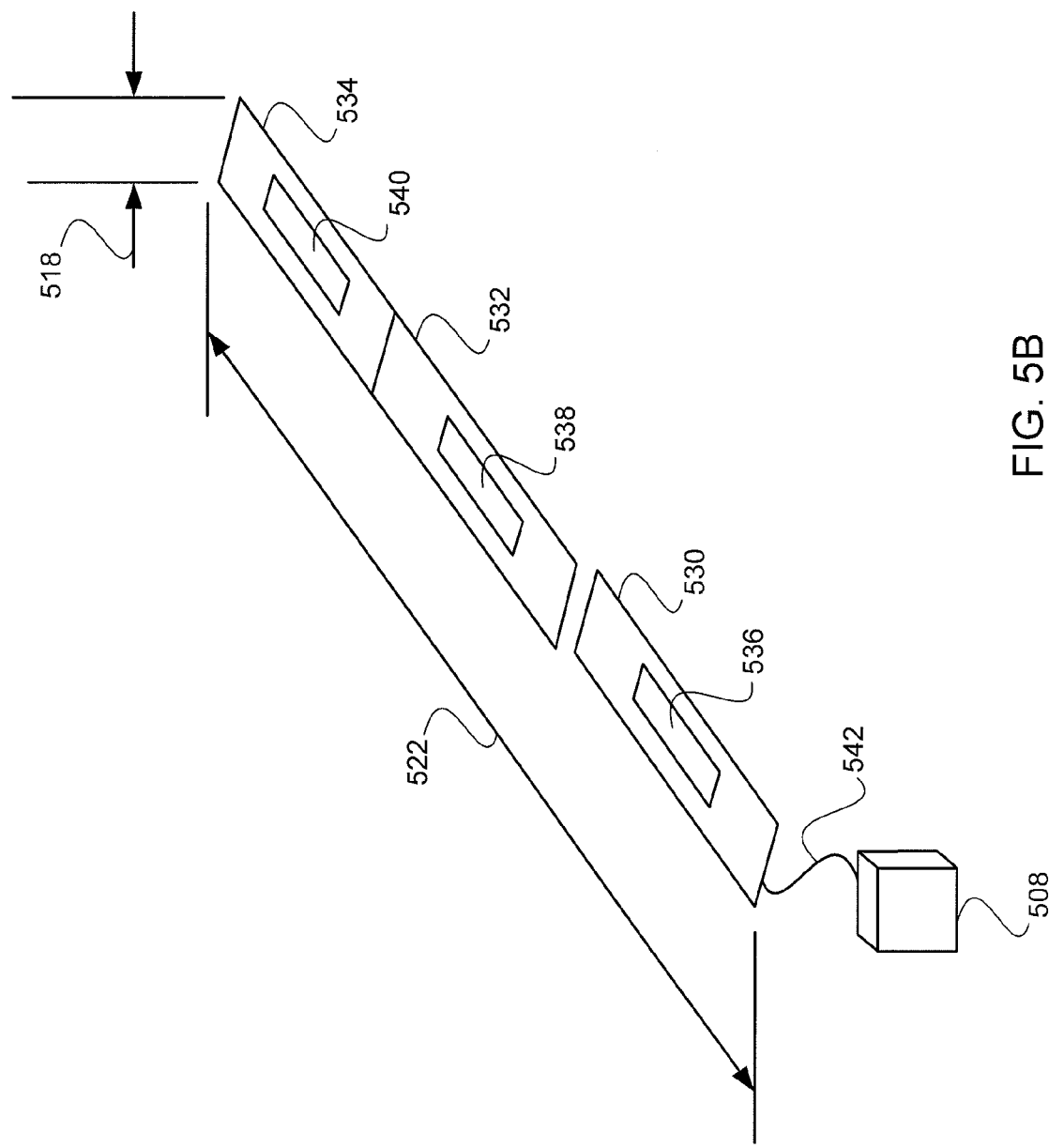
FIG. 5B is an exemplary arrangement of antenna elements forming an antenna line such as those illustrated in FIG. 5A.

The present inventor studied and tested various different configurations of antennas and tags. Antennas were hung from poles in variety of different angles; they were placed on the ground; and they were used in a variety of different numbers. FIG. 5B is an exemplary arrangement of antenna elements forming an antenna line such as the antenna line 514 illustrated in FIG. 5A. Each antenna element 536, 538, 540 is positioned within a casing 530, 532, 534 and then positioned adjacent to one another across a width 522 of the path of travel of the event participants to form the antenna line 514. For a particular athletic event, more or less elements may be used, as required by the layout of the athletic event course.

Figure 5C:
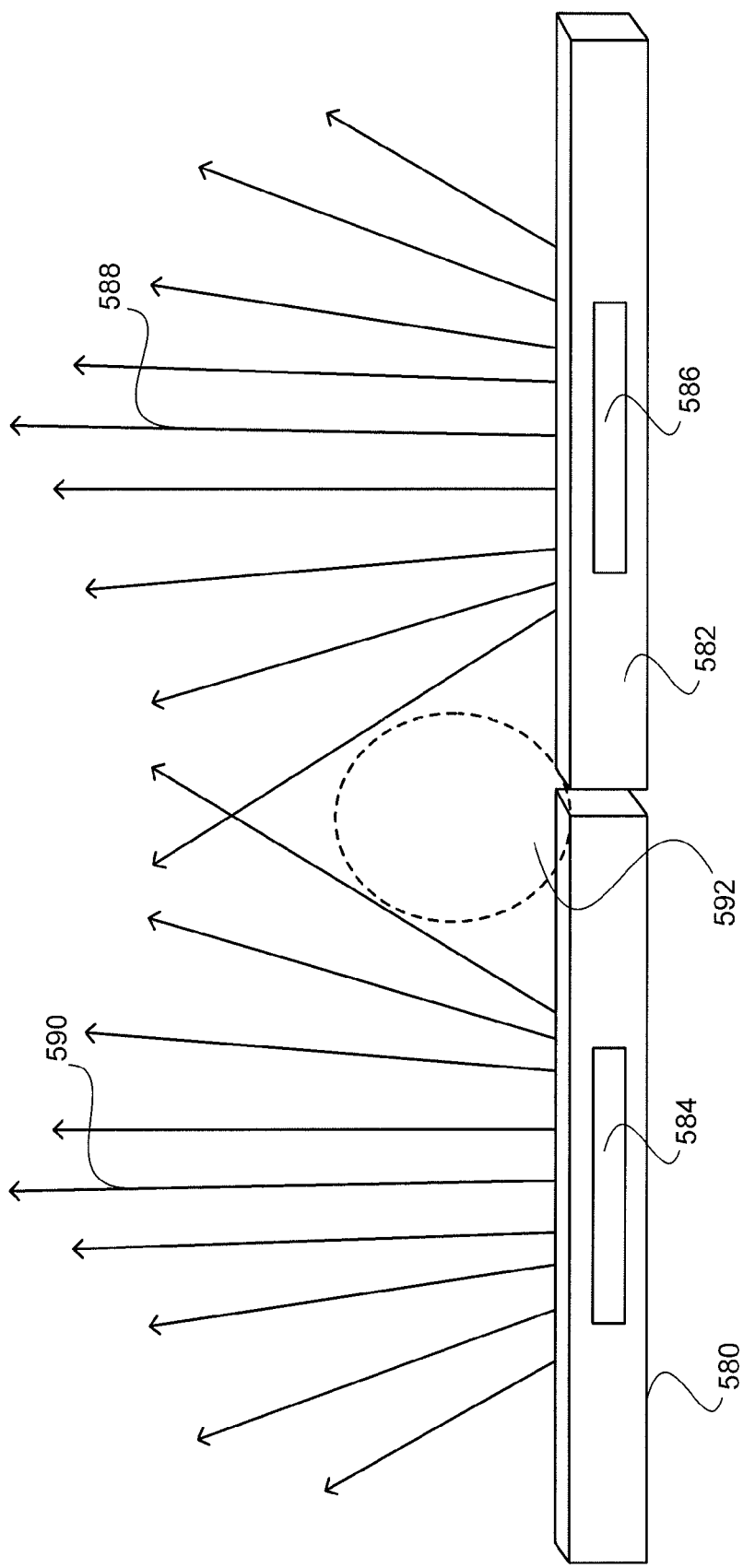
FIG. 5C is a side view of two exemplary antenna elements and radiation characteristics thereof.

The inventor discovered that commercially available antennas, such as the antenna elements 584, 586 shown in FIG. 5C, in close proximity to one another create blind spots 592 where radiation patterns 590, 588 from adjacent antennas 584, 586 create null fields. The inventor also discovered that existing, commercially available antennas, although typically producing excellent read rates when the tags were directly over them, were designed for radiating energy upward into space directly above them instead of along the horizontal path of the athlete's motion. Consequently, the inventor determined that the lower the angle of radiation from the horizon, the better the antenna was expected to perform.Cushcraft and Kathrein-Scala antennas were used in prototype systems until the custom antennas were available and used in pilot events. The custom antennas were designed to maximize the radiated energy along the athlete's path of travel. Kathrein-Scala antennas with a wide beam width were used widely for the first few pilots.

The term "dwell time" was coined by the inventor to describe the amount of time an athlete wearing a wireless data tag would have to spend in an UHF RF field created by the reader. Dwell time is the total time a wireless data tag would have to spend in an energy field to absorb surrounding RF energy and transmit its internal ID code. In participatory sports, the fastest athletes may run at 12.5 miles per hour. The number of athletes who could run at this speed for prolonged periods is few. Given a maximum speed expected of the athlete, one can determine the horizontal width of the field required along the path of athlete's travel so that enough RF energy is absorbed for the internal ID to be sent back.

In one example, measurements taken indicated that tags may be re-read at intervals of about 25 msec. Within that span of time, defined as the dwell time, a runner traveling at 12.5 Miles per hour would move about 0.14 meters. There is additional overhead time associated with the reader switching between transmit/read and switching between the antenna ports that would add to the required dwell time. The exact dwell time is a function of the antenna port rotation, switching between read/interrogate of the reader, and the speed of the athlete. To be on the conservative side, this distance was increased to 2.0 meters and used as an indicator of horizontal distance needed so that the tag remained within the RF energy field long enough to both receive enough RF energy and respond back to the reader antenna with the tag's ID code. In this example, the reader rotates through the multiple antennas connected to reader ports and only utilizes one antenna at a time for a short burst of time. After each burst of time (which may be on the order of 50 to 200 msec) the reader rotates to the next antenna while shutting the rest of the antennas off. The particular process that the reader uses to cycle through connected antennas is a function of algorithms used in the software controlling the reader. Multiple methods of data extraction and data storage in the reader were developed.

The inventor determined that there may be advantages to having two antenna lines arranged in close proximity to one another in case the first line fails to receive and record the transmitted athlete ID. Using two antenna lines, if the initial antenna line fails to provide an accurate read, the secondary antenna line placed in close proximity would enhance the probability of capturing the data tag's internal ID. A statistical approximation for overall read rate as a function of individual read rates per antenna line is provided in Table 1 below.

Figure 5D:
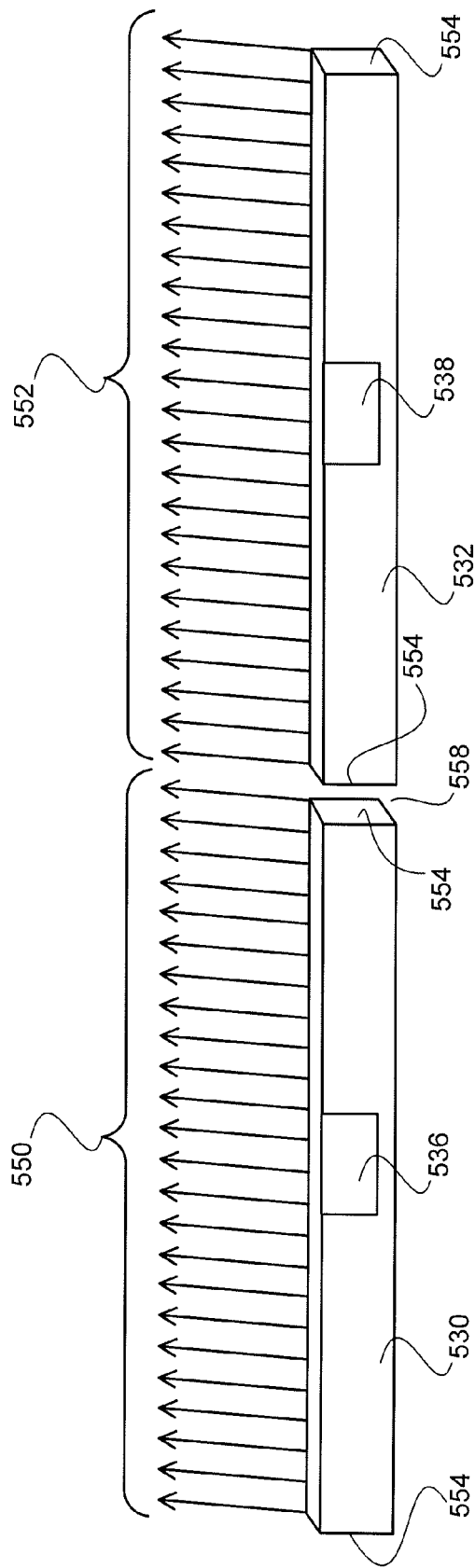
FIG. 5D is a side view of two exemplary customized antenna elements and radiation characteristics thereof.
Figure 5E:
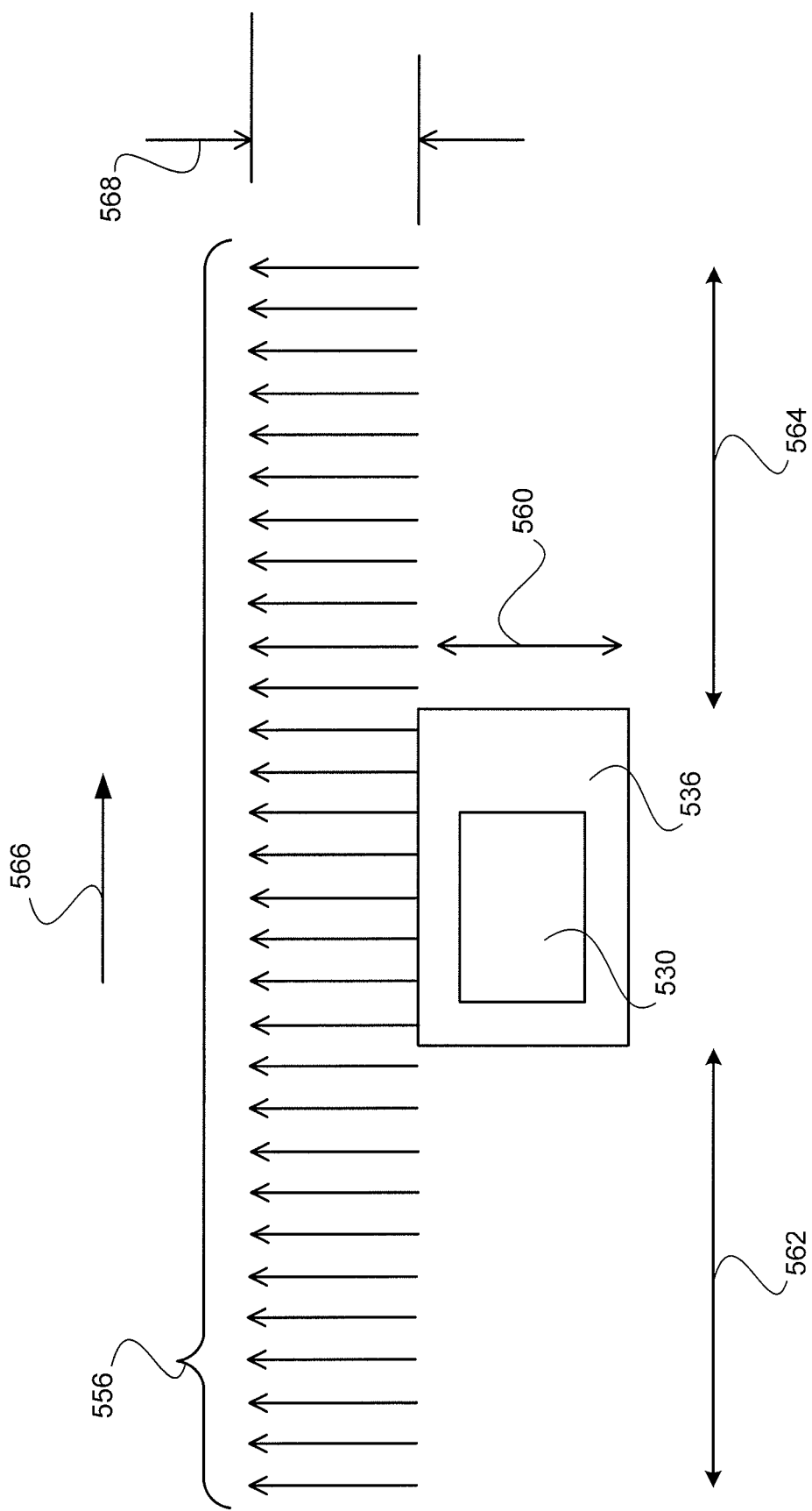
FIG. 5E is an end view of one of the antenna elements shown in FIG. 5D and radiation characteristics thereof.
Figure 5F:
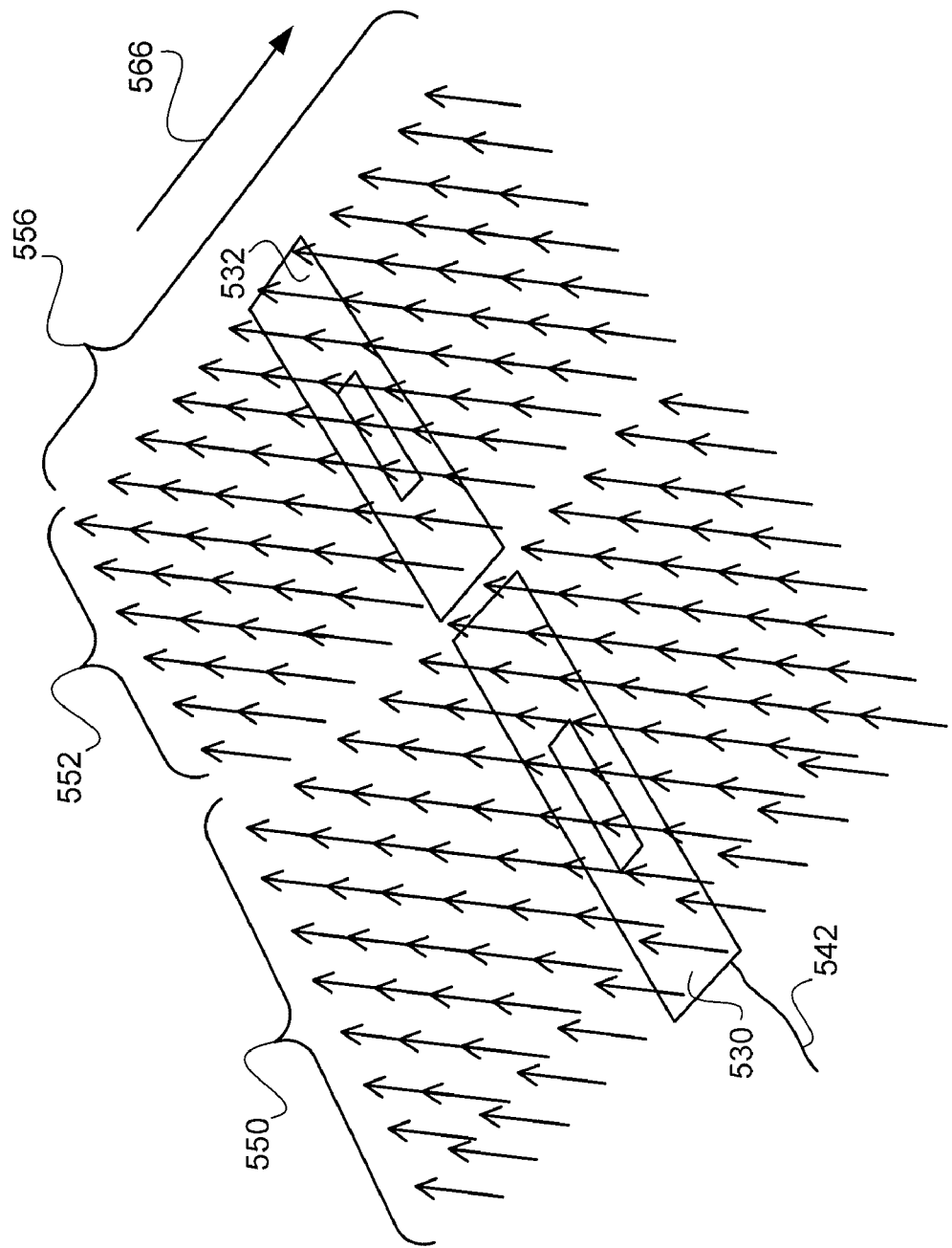
FIG. 5F is a perspective view of the two antenna elements shown in FIG. 5D and radiation characteristics thereof.

FIGS. 5D, 5E, and 5F show exemplary customized antenna elements and the preferred radiation characteristics thereof for use in a participatory athletic event timing system based on backscattering modulation in the UHF band. Custom antennas are preferred for a UHF based participatory athletic event timing system. Commercial antennas tend to have a narrower beam and are designed to provide an adequate range for in a narrower region of space than is desired for athletic event timing system antennas.

The present inventor determined that the antenna elements 530, 538 (as shown in FIG. 5D) are each preferably placed in protective casings 536, 532 to both weather proof the antenna and to protect it from the repeated pounding of the runners going over it. Preferably, the antenna element is designed to provide a uniform radiation pattern hovering over the road surface in a rectangular shape, as depicted in FIGS. 5D, 5E, and 5F. The width 550, 552 of the radiation pattern is lined up perpendicular to the direction of travel 566 by the runners or event participants. The length of the field is along the direction of the runners travel 566 and should be long enough to meet the dwell time spec. This spec is the required time for a tag to stay in the field to turn on and transmit its ID back to the interrogating antenna.

In one embodiment, the width 550, 552 of the radiation field may be 3 or 4 feet wide. A casing of the same size is preferably used so that the antenna line may be easily setup by placing adjacent casings side by side, as depicted in FIG. 5B, across the entire width of the street or path of event participants. The present inventor discovered that sizing the antenna casing 530 to match the width of field 550 of the antenna element 536 (by cutting the casing 530 or includes ends 554, where the radiation pattern drops off) allows for simple end to end placement of adjacent antenna casings 530, 532 (i.e. where ends 554 of adjacent antennas may be touching one another or where any space 558 between adjacent ends 554 is negligible). The antenna casing 536 is preferably as thin as possible, perhaps with a thickness 560 of 1 inch or less above the road surface so as to minimize obstructions in the path of event participants.

The radiation pattern of custom antennas are preferably uniform and have sharp drop offs at the ends 554 of the antenna casings, as shown in FIG. 5D, so that adjacent casings placed side by side result in minimal interference between adjacent antenna radiation patterns. The radiation pattern of custom antennas along the direction of the participants travel 566 are also preferably uniform. FIG. 5E depicts a side view of a customized antenna with the desired radiation pattern. In one embodiment, for several feet before 562 and after 564 the actual element 530, a passive RFID tag would enter the field of the antenna and spend sufficient time in there to power up and transmit its ID back. Preferably, the antenna element 530 is designed to provide a radiation pattern hovering to a height 568 of at least 1 foot above the road surface (or above the antenna element 530 or above the antenna casing 536). FIG. 5F is a perspective view showing preferable antenna radiation patterns for to side by side customized antennas 530, 532. The radiation patterns in both length of field 556 and width of field 550, 552 are preferably uniform and have sharp drop offs (i.e. step function) along the edges.

The uniformity of radiation in the width of field 550, 552 direction (as in FIG. 5D) is preferred to avoid creation of dead spots 592 as shown in FIG. 5C. FIG. 5C depicts a commercial antenna radiation pattern with a narrow radiation field pattern. Overlap of the radiation field can also lead to creation of constructive and destructive radiation fields and hence lead to dead spots 592 due to destructive cancellation of the field. Efforts to minimize dead spots 592 between adjacent antenna elements 584, 586 may include attempts to space apart adjacent antenna casings 580, 582, requiring trial and error and guessing on the part of event organizers and still does not result in uniform radiation patterns or radiation patterns of sufficient width 550 and length 556.

Figure 6:
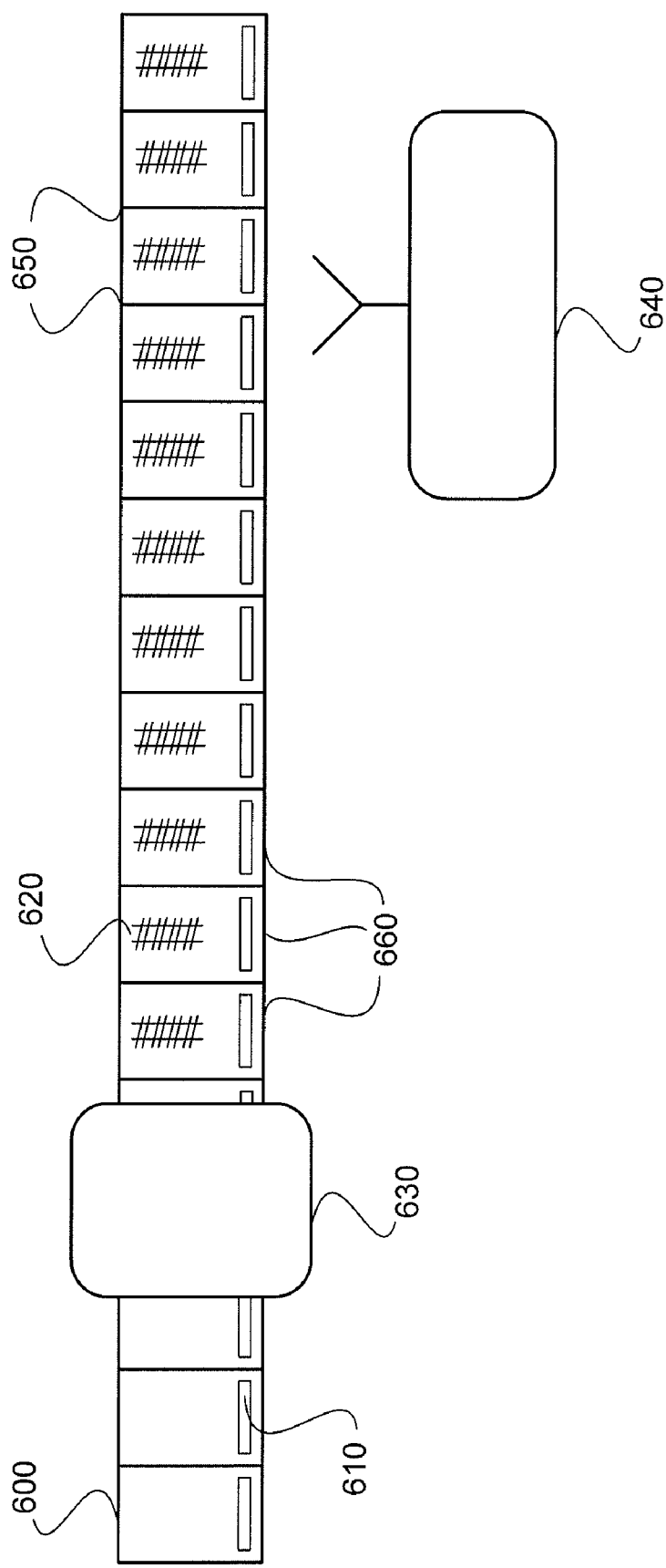
FIG. 6 is an exemplary system for printing bib numbers and encoding data tags attached to the bib numbers.

FIG. 6 is an exemplary system for printing bib numbers and encoding data tags attached to the bib numbers. In one embodiment, as shown, RFID tags 610 are attached to bibs 600 before bib numbers 620 are printed on the bibs and also before the tags are encoded (i.e. written to) with their tag ID's. The bibs with attached tags are then fed through an ink printer 630 that prints the bib numbers 620 on the bibs. The bibs with unencoded tags are then passed through an RFID printer 640 that writes (or encodes) the bib numbers into the tag memories. The ink printer 630 and the RFID printer 640 print and write the bib numbers in the same sequence, starting from the same number. Following the writing/encoding, the bibs are separated from one another along the creases or perforations 650.

Those skilled in the art will immediately appreciate that the particular order of method steps performed may be changed and that certain steps may be combined if, for example, equipment becomes available for such combination. For example, the RFID printer 640 may encode the tags 610 before running through the ink printer 630 so that the bibs 660 emerging from the ink printer 630 are fully prepared bibs having encoded RFID tags attached, ready for separation along perforations between successive bibs and distribution to event participants. As another example, the function of the ink printer 630 may be combined with the function of the RFID printer 640 so that bibs without printed bib numbers but with attached tags may be passed through a singled integrated ink printer/RFID printer (not shown). The bibs 660 emerging from such an integrated or combined ink printer/RFID printer are fully prepared, ready for separation and distribution to event participants.

Figure 7:
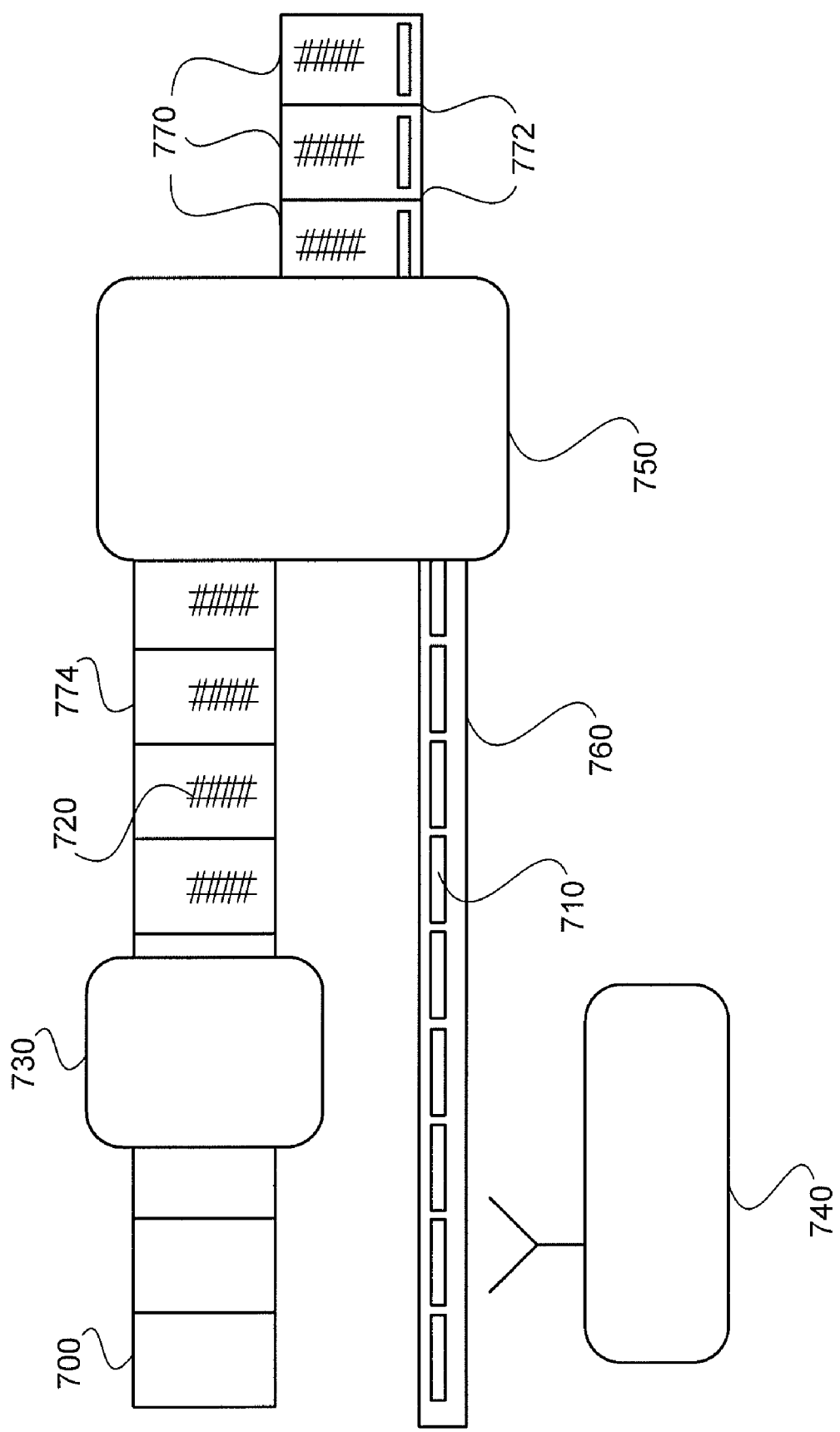
FIG. 7 is an exemplary system for printing bib numbers, encoding data tags, and attaching the encoded data tags to the bib numbers.

FIG. 7 is an exemplary system for printing bib numbers, encoding data tags, and attaching the encoded data tags to the bib numbers. The bibs 700 preferably comprise a tear resistant, water proof paper capable of running through an ink printer 730. Once the bib number 720 is printed on the bib 700, it is fed through tag attaching device 750 that removes each tag previously encoded by RFID printer 740 from a tag backing material 760 and attaches the encoded tag 710 to the printed bibs 774. The sequence of printed bibs 774 and encoded tags 710 are matched so that the bibs 770 emerging from the tag attaching device 750 are fully prepared bibs 770 having encoded RFID tags attached, ready for separation along perforations 772 between successive bibs and distribution to event participants.

As with the printing processes described for FIG. 6, the particular order of method steps performed may be changed and that certain steps may be combined if, for example, equipment becomes available for such combination. For example, the RFID printer 740 may follow the tag attaching device 750 instead of preceding it as shown. Likewise the ink printer 730 may follow the tag attaching device 750 instead of preceding it as shown. Or both the RFID printer 740 and ink printer 730 may follow the tag attaching device 750 instead of preceding it as shown. Also similar to the processes described for FIG. 6, any of the devices shown may be combined to perform any or all of the functions required. For example, the tag attaching device 750 may comprise a combined RFID and ink printer that receives as its inputs blank bib paper 700 and unencoded RFID tags 710 on a backing material 760 and yields as its output fully prepared bibs 770 having encoded RFID tags attached, ready for separation along perforations 772 and distribution to event participants.

PILOT TESTING

Falmouth Road Race, Aug. 12, 2007: Two different antenna lines of 28 ft wide were constructed utilizing the UHF Impinj readers. Each reader had enough ports to connect to 4 antennas. One of the antenna lines was set flat on the street near the start of the event and a second line was setup near the 3 mile mark of the event. The second line used antennas mounted on poles to test the read rate for RFID tags attached to the athlete's racing bibs (referred to as "chest tags" or "bib tags").

The bibs for this event included two sets of tags, the AD 622 and the AD 222, which were both attached to bibs. The AD 622 tags were kept on the bibs, but the athletes were asked to peel the AD 222 tags from their bibs and use the hole that was inserted into the side of the AD 222 to tie the tag into their shoe laces. The encoding of the tags was performed so as to allow readers to distinguish between which one of the two Class 1 Gen 2 RFID tags on an athlete was being read. Primary timing for the event used ChampionChip conventional ROM based readers and tags (i.e. lower frequency, magnetic coupling type systems), and the UHF systems and methods were used for pilot testing only.

The results of the pilot were mixed and uncertain. Many athletes didn't bother with the request to reattach the AD 222 tags to their shoes (referred to as "shoe tags"). The bib tags were worn by all athletes, but the shoe tags were tied into shoe laces by only a fraction of the athletes. The antennas laid down on the road were able to read the IDs of about 60% of the bib tags worn by athletes. But the road antennas were meant for the shoe tags and not the bib tags. The second set of antennas that were mounted on poles and meant to read the bib tag did not read more than about 50% of the bib tags.

Read rates were lower than expected because wearing of the shoe tags by athletes was not enforced by the event managers, and the pole antennas were not adequate for proper reading of bib tags, which were in close proximity to the athlete's chest.

Chicago Half Marathon, Sep. 9, 2007: Although chest (i.e. bib) tags were also printed on the bibs, only shoe tags were read in this pilot. The shoe tags were delivered to the event attached to the bibs, and the athletes were asked to peel off and reattach their tag to their shoe by lacing their tag through their shoe laces. Two separate lines of UHF antennas were laid down on the street for data collection. The primary system for timing the event again used ChampionChip conventional ROM based readers and tags, and the UHF systems and methods were used for pilot testing only.

A much higher number of athletes put their shoe tag on as requested, and, consequently, the read rate was higher than the prior pilot. A total of 8,289 unique reads were captured. The actual number of finishers in the Chicago half marathon was 10,118. The read rate for a single antenna line was: 0.8192 (8,289/10,118), or 81.92%. The exact number of runners who wore their shoe tags is not known. Based on the read rates, overall read rates for two separate antenna lines in close proximity (i.e. 12 feet apart) were determined. The requested target overall read rate was 98%.

A statistical approximation was used to determine the overall read rates of two separate antenna lines in close proximity. This approximation is based on a binomial distribution. In this calculation each antenna line's read rate is assumed to be an independent process and not a function of a different line's read rate.

Our Assumptions:
Let N be the # participants in an event;
Let n be the number of athletes not identified by an antenna line; and
Let p be the read rate per antenna line.

From the above assumptions, lets choose p=0.9. This read rate amounts to 9 out of 10 participants being read over a single antenna line. Let's assume there are 1,000 runners, so the first read would cover, 1,000*0.9=900 participants; n=1,000−900=100. On the second read with an expected average of 90%, an additional 100*0.9=90 runners are read. At this point the total number of runners read after the second read is at 990 (900+90) or 99% of the field. Table 1, showing read rates versus the number of athletes was constructed to aid with determination of the number of antenna lines required.

TABLE 1

| # athletes | p = 0.80 | | p = 0.85 | | p = 0.90 | | p = 0.95 | |
|---|---|---|---|---|---|---|---|---|
| | 1st Read | Overall Read | 1st Read | Overall Read | 1st Read | Overall Read | 1st Read | Overall Read |
| 100 | 80 | 96 | 85 | 97.75 | 90 | 99 | 95 | 99.75 |
| 500 | 400 | 480 | 425 | 488.75 | 450 | 495 | 475 | 498.75 |
| 1000 | 800 | 960 | 850 | 977.5 | 900 | 990 | 950 | 997.5 |
| 3000 | 2400 | 2880 | 2550 | 2932.5 | 2700 | 2970 | 2850 | 2992.5 |
| 5000 | 4000 | 4800 | 4250 | 4887.5 | 4500 | 4950 | 4750 | 4987.5 |
| 7500 | 6000 | 7200 | 6375 | 7331.25 | 6750 | 7425 | 7125 | 7481.25 |
| 10000 | 8000 | 9600 | 8500 | 9775 | 9000 | 9900 | 9500 | 9975 |
| 15000 | 12000 | 14400 | 12750 | 14662.5 | 13500 | 14850 | 14250 | 14962.5 |
| 20000 | 16000 | 19200 | 17000 | 19550 | 18000 | 19800 | 19000 | 19950 |

For this pilot, using off-the-shelf UHF antennas, the overall read rates of two antenna lines was very conservatively estimated to be near 95% read rates, even when it was certain that not all runners put their shoe tags on. Customized antennas were expected for subsequent pilots and were expected to improve the read rate of each line by a few percentage points.

Detroit Marathon, Oct. 21, 2007: Customized antennas were used in this pilot. The supplier's antenna elements were used in one complete 28 foot line of antennas laid across the width of the running path. The primary system for timing the event again used ChampionChip conventional ROM based readers and tags, and the UHF systems and methods were used for pilot testing purposes only.

Results of this pilot were very successful and met all targets, requirements, and objectives. The custom antenna read rates were better than the commercially available, off-the-shelf antennas used in prior pilots. Consequently, the present inventor's timing methods and systems using the UHF Class 1 Gen 2 tags and UHF antennas were deemed successful by the event managers and organizers. The present inventor's timing methods and systems were subsequently used at the Philadelphia Marathon, Las Vegas Marathon, and other premier events as the primary and the only timing system.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method of collecting information from participants in a participative athletic event, the method comprising:

receiving information from a plurality of wireless data tags using one or more antennas adapted for use in the participatory athletic event and capable of radiating at UHF frequencies for communications with the plurality of wireless data tags that are tuned to such frequencies, and suitably designed so as to provide uniformly distributed radiated energy along a participant's path of travel in a participatory athletic event and to provide sharp drop offs in radiated energy perpendicular to said participant's path of travel for minimizing interference with other adjacently positioned antennas among said one or more antennas, wherein said one or more antennas include casing material that extends in a width of field direction perpendicular to said participant's path of travel ending where radiated energy drops off so that casing material of adjacently positioned antennas may be positioned end to end without spaces therebetween; and determining participant bib numbers corresponding to respective wireless data tags among said plurality of wireless data tags using only said information received from said plurality of wireless data tags or mathematical calculations therefrom.

2. A participatory athletic event timing system based on backscattering modulation in the UHF band, the system comprising:

one or more antennas adapted for use in a participatory athletic event and capable of radiating at UHF frequencies for communications with devices tuned to such frequencies, and suitably designed so as to provide uniformly distributed radiated energy along a participant's path of travel in a participatory athletic event and to provide sharp drop offs in radiated energy perpendicular to said participant's path of travel for minimizing interference with other adjacently positioned antennas among said one or more antennas, wherein said one or more antennas include casing material that extends in a width of field direction perpendicular to said participant's path of travel ending where radiated energy drops off so that casing material of adjacently positioned antennas may be positioned end to end without spaces therebetween.

3. The system of claim 2, wherein the devices are wirelessly writable and wirelessly readable data tags with information uniquely associating said at least one data tag with at least one participant bib.

4. The system of claim 3, wherein said the wirelessly writable and wirelessly readable data tags are both readily detachable from the at least one participant bib and operably reattachable in a location other than on the at least one participant bib for use during the participatory athletic event using the participatory athletic event timing system.

* * * * *